United States Patent
Larcher et al.

(10) Patent No.: US 7,964,527 B2
(45) Date of Patent: *Jun. 21, 2011

(54) CATALYTIC COMPOSITIONS COMPRISING THE OXIDES OF ZIRCONIUM, CERIUM, YTTRIUM, LANTHANUM AND OTHER RARE EARTHS

(75) Inventors: Olivier Larcher, Perigny (FR); Stephan Verdier, Lyons (FR); Emmanuel Rohart, Sainte Soulle (FR); Aimin Huang, Shanghai (CN)

(73) Assignee: Rhodia Operations, Aubervilliers Cedex (FR)

( * ) Notice: Subject to any disclaimer, the term of this patent is extended or adjusted under 35 U.S.C. 154(b) by 29 days.

This patent is subject to a terminal disclaimer.

(21) Appl. No.: 12/279,382

(22) PCT Filed: Feb. 13, 2007

(86) PCT No.: PCT/EP2007/051387
§ 371 (c)(1),
(2), (4) Date: Feb. 27, 2009

(87) PCT Pub. No.: WO2007/093593
PCT Pub. Date: Aug. 23, 2007

(65) Prior Publication Data
US 2009/0274599 A1 Nov. 5, 2009

(30) Foreign Application Priority Data

Feb. 17, 2006 (FR) .................. 06 01407
Nov. 16, 2006 (FR) .................. 06 10032

(51) Int. Cl.
B01D 53/60 (2006.01)
B01D 53/94 (2006.01)
B01J 8/02 (2006.01)
C01G 25/02 (2006.01)
B01J 23/10 (2006.01)

(52) U.S. Cl. ............... 502/302; 423/213.2; 423/594.12; 502/303; 502/304; 502/349

(58) Field of Classification Search .............. 423/213.2, 423/594.12; 502/302, 303, 304, 349
See application file for complete search history.

(56) References Cited

U.S. PATENT DOCUMENTS

| 4,657,644 A | 4/1987 | Bachot et al. |
| 6,171,572 B1 * | 1/2001 | Aozasa .................. 423/594.12 |

(Continued)

FOREIGN PATENT DOCUMENTS

EP 0842900 A1 5/1998

(Continued)

OTHER PUBLICATIONS

Vidmar et al., "Effects of Trivalent Dopants on the Redox Properties of Ce0.6Zr0.4O2 Mixed Oxide", Journal of Catalysis, 1997, pp. 160-168, vol. 171.

S. Brunauer et al., "Adsorption of Gases in Multimolecular Layers", *The Journal of the American Chemical Society*, vol. 60, Feb. 1938, pp. 309-319.

*Primary Examiner* — Stuart Hendrickson
*Assistant Examiner* — Syed Iqbal
(74) *Attorney, Agent, or Firm* — Buchanan Ingersoll & Rooney, P.C.

(57) ABSTRACT

Catalytic compositions useful, e.g., for the treatment of internal combustion engine exhaust gases, are based on zirconium oxide in a weight proportion of at least 25%, from 15% to 60% of cerium oxide, from 10% to 25% of yttrium oxide, from 2% to 10% of lanthanum oxide and from 2% to 15% of another rare earth oxide, have a specific surface of at least 15 m²/g and a cubic phase, and are prepared from a mixture of zirconium, cerium, yttrium, lanthanum and the additional rare earth, by precipitating such mixture with a base, heating the precipitate in an aqueous medium, adding thereto a surfactant and calcining the precipitate.

24 Claims, 2 Drawing Sheets

U.S. PATENT DOCUMENTS

Figure 1:
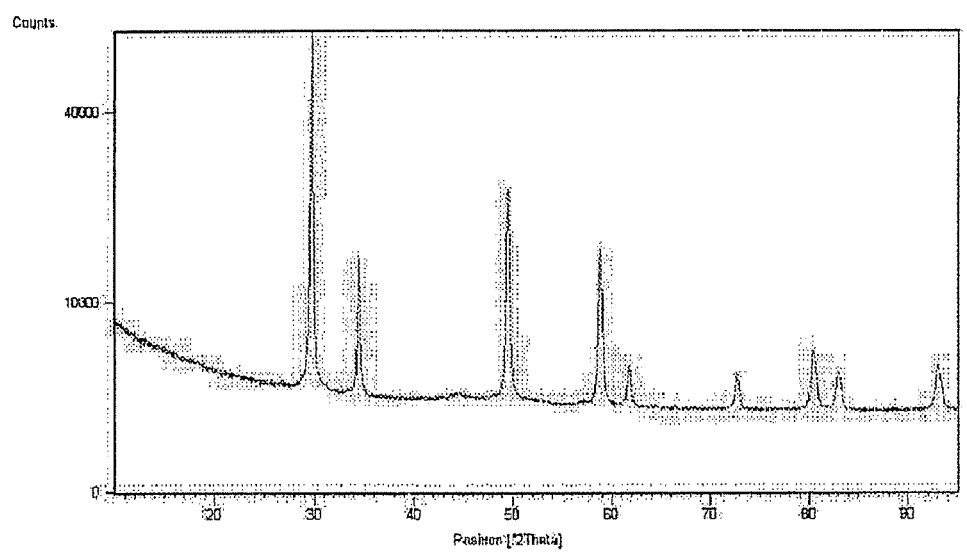

| | | |
|---|---|---|
| 6,214,306 B1 | 4/2001 | Aubert et al. |
| 6,228,799 B1 * | 5/2001 | Aubert et al. .................. 502/304 |
| 6,387,338 B1 * | 5/2002 | Anatoly et al. ............. 423/239.1 |
| 2003/0124035 A1 * | 7/2003 | Bert et al. ...................... 422/171 |
| 2006/0210462 A1 * | 9/2006 | Larcher et al. ............. 423/213.2 |
| 2007/0244002 A1 * | 10/2007 | Kozlov ......................... 502/304 |
| 2010/0040523 A1 * | 2/2010 | Larcher et al. ............. 423/213.2 |

FOREIGN PATENT DOCUMENTS

| | | |
|---|---|---|
| FR | 2570087 A1 | 3/1986 |
| FR | 2793161 A1 | 11/2000 |
| WO | WO 97/02213 A1 | 1/1997 |
| WO | WO 98/45212 | 4/1998 |
| WO | WO 2004/085039 A1 | 10/2004 |

* cited by examiner

CATALYTIC COMPOSITIONS COMPRISING THE OXIDES OF ZIRCONIUM, CERIUM, YTTRIUM, LANTHANUM AND OTHER RARE EARTHS

CROSS-REFERENCE TO PRIORITY/PCT APPLICATIONS

This application claims priority under 35 U.S.C. §119 of FR 0601407, filed Feb. 17, 2006, FR 0610032, filed Nov. 16, 2006, and is a continuation/national phase of PCT/EP 2007/051387, filed Feb. 13, 2007 and designating the United States (published in the French language on Aug. 23, 2007, as WO 2007/093593 A1; the title and abstract were also published in English), each hereby expressly incorporated by reference in its entirety and each assigned to the assignee hereof.

The present invention relates to a composition based on oxides of zirconium, of cerium, of yttrium, of lanthanum and of another rare earth, to its preparation method and to its use in catalysis, especially for treating automobile exhaust gases.

Catalysts known as multifunctional catalysts are currently used for treating exhaust gases of internal combustion engines (automobile post-combustion catalysis). The term "multifunctional" is understood to mean catalysts capable of carrying out not only oxidation, in particular of carbon monoxide and of hydrocarbons present in the exhaust gases, but also reduction, in particular of nitrogen oxides also present in these gases ("three-way" catalysts). Zirconium oxide and cerium oxide today appear to be two constituents that are particularly important and advantageous for this type of catalyst. In order to be effective, these oxides must have a high specific surface area, even at high temperature.

There is a need for catalysts capable of being able to be used at increasingly high temperatures and, for this purpose, having great stability of their specific surface area.

A first subject of the invention is therefore the development of a composition which can meet this need.

Furthermore, another quality required for these oxides or materials is their reducibility. The term "reducibility" is understood to mean, here and for the rest of the description, the degree of cerium IV in these materials capable of being converted to cerium III under the effect of a reducing atmosphere and at a given temperature. This reducibility may be measured, for example, by hydrogen consumption in a given temperature range. It is due to the cerium, which has the property of being reduced or being oxidized. This reducibility should, of course, be as high as possible.

It is therefore advantageous to obtain products that have both a high reducibility and a stabilized specific surface area, that is to say that have a sufficient surface area value at high temperature.

A second subject of the invention is the development of a composition which may offer an advantageous combination of these properties.

For this purpose, the composition of the invention, according to a first variant, is based on oxides of zirconium, of cerium and of yttrium and it is characterized in that it also comprises lanthanum oxide and an oxide of an additional rare earth other than cerium, lanthanum and yttrium, in a weight proportion of zirconium oxide of at least 25%, between 15% and 60% of cerium oxide, between 10% and 25% of yttrium oxide, between 2% and 10% of lanthanum oxide and between 2% and 15% of the oxide of the additional rare earth, the composition also having, after calcining for 10 hours at 1150° C., a specific surface area of at least 15 m$^2$/g and also a cubic phase.

According to a second variant of the invention, the composition of the invention is based on oxides of zirconium, of cerium and of yttrium and it is characterized in that it also comprises lanthanum oxide and an oxide of an additional rare earth other than cerium, lanthanum and yttrium, in a weight proportion of zirconium oxide of at least 25%, between 15% and 60% of cerium oxide, between 10% and 25% of yttrium oxide, between 2% and 10% of lanthanum oxide and between 2% and 15% of the oxide of the additional rare earth; in that it has a degree of reducibility, measured on a composition calcined for 4 hours at 900° C. of at least 80%, the composition also having, after calcining for 10 hours at 1150° C., a specific surface area of at least 15 m$^2$/g and also a cubic phase.

As was mentioned above, the compositions of the invention have high specific surface area values even after calcining at a high temperature of 1150° C.

Figure 2:
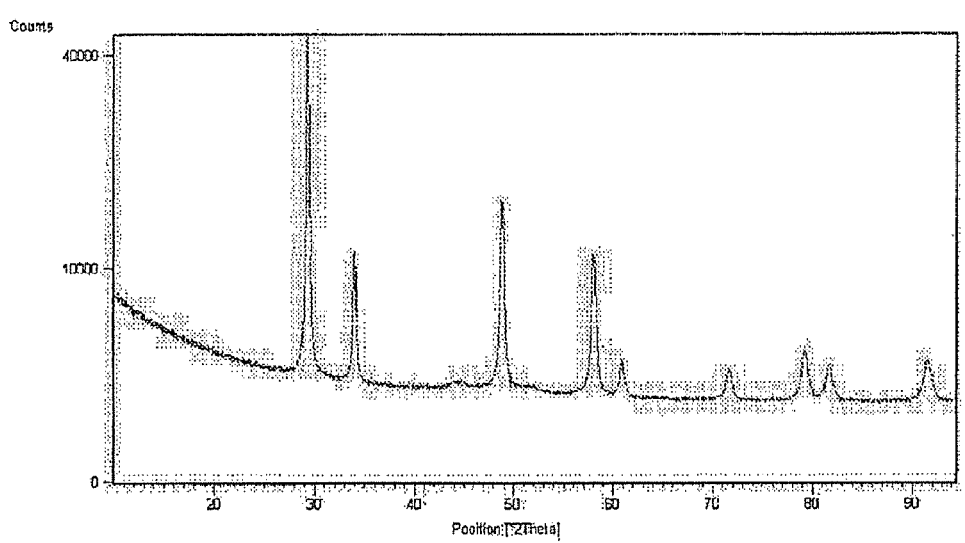
Figure 3:
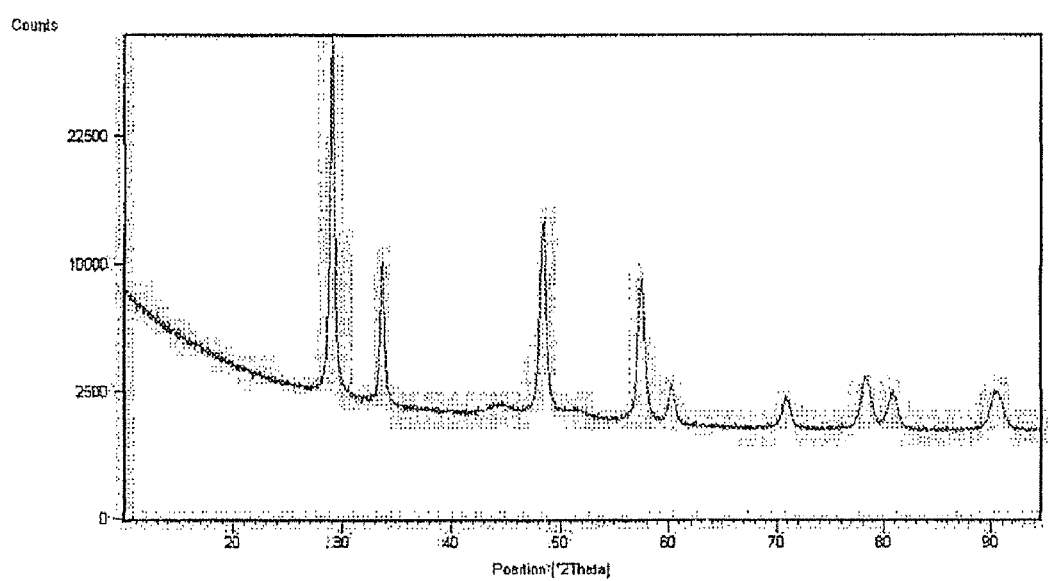

Other features, details and advantages of the invention will become even more fully apparent on reading the description which follows, and the appended drawings in which:

FIGS. 1 to 3 are X-ray diagrams of products according to the invention.

For the remainder of the description, the expression "specific surface area" is understood to mean the BET specific surface area determined by nitrogen adsorption in accordance with the ASTM D 3663-78 Standard, established from the Brunauer-Emmet-Teller method described in the periodical "The Journal of the American Chemical Society, 60, 309 (1938)".

Moreover, the calcinings, at the end of which the surface area values are given, are calcinings in air.

The term "rare earth" is understood to mean the elements from the group composed of yttrium and the elements of the Periodic Table with atomic numbers between 57 and 71 inclusive.

The contents are given as oxides, unless otherwise indicated. The cerium oxide is in ceric oxide form; the oxides of the other rare earths are in the $Ln_2O_3$ form, Ln denoting the rare earth, with the exception of praseodymium, which is expressed in the $Pr_6O_{11}$ form.

It is specified, for the remainder of the description, that, unless otherwise indicated, in the ranges of values which are given, the values at the limits are included.

The more specific features which will now be given apply to the two variants unless otherwise indicated.

The compositions according to the invention are characterized by the nature of their constituents. As indicated above, they are based on zirconium and cerium and also on at least three other rare earths which are yttrium, lanthanum and an additional rare earth other than cerium, yttrium and lanthanum, these elements being present in oxide form and in the weight proportions which have been given above.

The invention of course covers the case where the compositions comprise several additional rare earths, that is to say other than cerium, yttrium and lanthanum, in combination. The additional rare earth(s) may be chosen more particularly from neodymium, praseodymium, gadolinium and samarium, and also combinations thereof.

The compositions of the invention are also characterized by their specific surface area, which is at least 15 m$^2$/g after calcining at 1150° C. for 10 hours. As will be seen later on, surface area values of at least 20 m$^2$/g may be obtained and the compositions of the invention may even attain, under these same calcining conditions, surface areas ranging up to around 25 m$^2$/g.

This surface area may be at least 30 m$^2$/g after calcining for 4 hours at 1000° C. More particularly, under these same calcining conditions, this surface area may be at least 40 m$^2$/g.

It is possible to obtain values that range up to around 65 m²/g in the case of compositions according to the first variant and ranging up to around 50 m²/g in the case of compositions according to the second variant.

The surface area may be at least 60 m²/g and more particularly at least 65 m²/g after calcining for 4 hours at 900° C. in the case of compositions according to the first variant and it may be at least 45 m²/g and more particularly at least 50 m²/g after calcining under the same conditions in the case of compositions according to the second variant.

Finally, it may be at least 15 m²/g and more particularly at least 20 m²/g after calcining for 10 hours at 1100° C., or even at least 30 m²/g in certain cases for the compositions according to the first variant.

The compositions of the invention are furthermore characterized by the nature of the crystallographic phase that they exhibit. This is because these compositions are in the form of a cubic phase, of fluorine type, that is preferably pure, this being the case after calcining under the conditions given above (1150° C. in air). The compositions of the invention therefore have a high phase stability. This structure of the phase is determined by X-ray diffraction analysis.

More particular embodiments of the invention will now be described.

Thus, the compositions may have a total weight proportion of oxides of yttrium, of lanthanum and of the additional rare earth which is at most 30%.

According to another embodiment, they may also have a proportion of zirconium oxide of at least 40% and a proportion of cerium oxide of at most 40%.

According to yet another embodiment, they may also have a proportion of zirconium oxide of at least 50% and a proportion of cerium oxide of at most 25%.

The compositions of the invention may also more particularly have the following weight proportions: zirconium oxide: at least 50%, cerium oxide: between 15% and 30% and more particularly between 15% and 20%, yttrium oxide: between 10% and 20% and lanthanum oxide: between 2% and 5%. For this embodiment with the latter proportions of oxides, the additional rare earth may even more particularly be neodymium or praseodymium. In this particular case, the composition according to the first variant of the invention may have, after calcining for 4 hours at 1000° C., a specific surface area of at least 45 m²/g. Finally, in the case where the additional rare earth is praseodymium or neodymium, the compositions of the invention may have, after calcining for 10 hours at 1150° C., a specific surface area of at least 20 m²/g.

According to yet another more particular embodiment, the compositions have the same proportions as those given above in the preceding paragraph, with the exception of the content of yttrium oxide, which is here between 15% and 20%. In the latter case and for the compositions according to the first variant, the specific surface areas are at least 50 m²/g after calcining for 4 hours at 1000° C. and at least 30 m²/g after calcining for 10 hours at 1100° C.

The compositions of the invention that have an yttrium oxide content of at least 10% and an overall content of oxides of yttrium, of lanthanum and of the additional rare earth of at least 20% may have a surface area of at least 8 m²/g, more particularly of at least 10 m²/g after calcining for 10 hours at 1200° C.

The compositions according to the second variant of the invention have, as another feature, a high reducibility which is expressed by a degree of reducibility of at least 80%. This reducibility is generally less than 70% in the case of the compositions according to the first variant.

This degree of reducibility may more particularly be at least 85% and more particularly still at least 90%. It is specified here and for the remainder of the description that this degree of reducibility is measured on a composition which has undergone a calcination at 900° C. in air for 4 hours at a temperature hold.

The reducibility of the compositions is determined by the measurement of their hydrogen consumption measured between 30° C. and 900° C. This measurement is made by a programmed reduction in temperature using hydrogen diluted in argon. A signal is detected with a thermal conductivity detector. The consumption of hydrogen is calculated from the missing area of the hydrogen signal from the baseline at 30° C. to the baseline at 900° C. The degree of reducibility represents the percentage of cerium reduced, it being understood that ½ mol of $H_2$ consumed and measured by this method corresponds to 1 mol of CeIV reduced.

The method for preparing the compositions of the invention will now be described.

This method for preparing the compositions according to the first variant of the invention is characterized in that it comprises the following steps:
(a) a mixture comprising compounds of zirconium, of cerium, of yttrium, of lanthanum and of the additional rare earth is formed;
(b) said mixture is brought into contact with a basic compound, whereby a precipitate is obtained;
(c) said precipitate is heated in an aqueous medium;
(d) added to the precipitate obtained in the preceding step is an additive chosen from anionic surfactants, nonionic surfactants, polyethylene glycols, carboxylic acids and salts thereof and surfactants of the carboxymethylated fatty alcohol ethoxylate type; and
(e) the precipitate thus obtained is calcined.

The first step (a) of the method therefore consists in preparing a mixture, in a liquid medium, of the compounds of the constituent elements of the composition, that is to say of zirconium, of cerium, of yttrium, of lanthanum and of the additional rare earth.

The mixing is generally carried out in a liquid medium which is preferably water.

The compounds are preferably soluble compounds. These may especially be zirconium, cerium and rare earth salts. These compounds may be chosen from nitrates, sulfates, acetates, chlorides or ceric ammonium nitrates.

Mention may thus be made, by way of examples, of zirconium sulfate, zirconyl nitrate or zirconyl chloride. Zirconyl nitrate is the most generally used. Mention may also be made in particular of cerium(IV) salts, such as nitrates or ceric ammonium nitrates, for example, which are particularly well suited in this instance. Preferably, ceric nitrate is used. It is advantageous to use salts with a purity of at least 99.5% and more particularly of at least 99.9%. An aqueous ceric nitrate solution can, for example, be obtained by reaction of nitric acid with a hydrated ceric oxide prepared conventionally by reaction of a solution of a cerous salt, for example cerous nitrate, and of an aqueous ammonia solution in the presence of aqueous hydrogen peroxide solution. It is also possible, preferably, to use a ceric nitrate solution obtained according to the method for electrolytic oxidation of a cerous nitrate solution, as described in the document FR-A-2 570 087, and which constitutes in this instance an advantageous starting material.

It should be noted in this instance that the aqueous solutions of cerium salts and of zirconyl salts may exhibit a degree of initial free acidity which can be adjusted by the addition of a base or of an acid. However, it is just as possible to use an initial solution of cerium and zirconium salts effectively exhibiting a degree of free acidity as mentioned above as solutions which will have been neutralized beforehand more or less exhaustively. This neutralization can be carried out by addition of a basic compound to the abovementioned mixture, so as to limit this acidity. This basic compound can, for example, be an aqueous ammonia solution or also a solution of alkali metal (sodium, potassium, and the like) hydroxides but preferably an aqueous ammonia solution.

Finally, it should be noted that, when the starting mixture comprises cerium in the III form, it is preferable to involve, in the course of the method, an oxidizing agent, for example aqueous hydrogen peroxide solution. This oxidizing agent can be used by being added to the reaction medium during step (a) or during step (b), in particular at the end of the latter.

It is also possible to use a sol as starting compound for the zirconium or cerium. The term "sol" denotes any system composed of fine solid particles of colloidal dimensions, that is to say of dimensions between approximately 1 nm and approximately 500 nm, based on a zirconium or cerium compound, this compound generally being a zirconium or cerium oxide and/or a hydrated zirconium or cerium oxide in suspension in a liquid aqueous phase, it additionally being possible for said particles optionally to comprise residual amounts of bonded or adsorbed ions, such as, for example, nitrates, acetates, chlorides or ammoniums. It should be noted that, in such a sol, the zirconium or the cerium may be found either completely in the form of colloids or simultaneously in the form of ions and in the form of colloids.

The mixture can without distinction be obtained either from compounds initially in the solid state which will be subsequently introduced into the bottom of a water vessel, for example, or also directly from solutions of these compounds and then mixing said solutions in any order.

In the second step (b) of the method, said mixture is brought into contact with a basic compound. Products of the hydroxide type can be used as base or basic compound. Mention may be made of alkali metal or alkaline-earth metal hydroxides. It is also possible to use secondary, tertiary or quaternary amines. However, amines and ammonia may be preferred insofar as they reduce the risks of contamination by alkali metal or alkaline-earth metal cations. Mention may also be made of urea. The basic compound may more particularly be used in the form of a solution.

The way in which the mixture and the basic compound are brought into contact, that is to say the order of introduction of these, is not critical. However, this operation of bringing into contact can be carried out by introducing the mixture into the basic compound in the form of a solution. This alternative form is preferable in order to obtain the compositions of the invention in the form of a pure cubic phase.

The operation in which the mixture and the basic compound are brought into contact, or the reaction between the mixture and the basic compound, in particular the addition of the mixture to the basic compound in the form of a solution, can be carried out all at once, gradually or continuously, and it is preferably carried out with stirring. It is preferably carried out at ambient temperature.

The following step (c) of the method is the step of heating the precipitate in an aqueous medium.

This heating can be carried out directly on the reaction medium obtained after reaction with the basic compound or on a suspension obtained after separation of the precipitate from the reaction medium, optional washing of the precipitate and placing the precipitate back in water. The temperature at which the medium is heated is at least 100° C. and more particularly still at least 130° C. The heating operation can be carried out by introducing the liquid medium into a sealed chamber (closed reactor of the autoclave type). Under the temperature conditions given above, and in an aqueous medium, it is thus possible to specify, by way of illustration, that the pressure in the closed reactor can vary between a value of greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating can also be carried out in an open reactor for temperatures in the vicinity of 100° C.

The heating can be carried out either in air or under an inert gas atmosphere, preferably nitrogen.

The duration of the heating can vary within wide limits, for example between 1 and 48 hours, preferably between 2 and 24 hours. Likewise, the rise in temperature is carried out at a rate which is not critical and it is thus possible to reach the reaction temperature set by heating the medium, for example, between 30 minutes and 4 hours, these values being given entirely by way of indication.

The medium subjected to the heating generally has a pH of at least 5. Preferably, this pH is basic, that is to say that it is greater than 7 and more particularly at least 8.

It is possible to carry out several heating operations. Thus, the precipitate obtained after the heating step and optionally a washing operation can be resuspended in water and then another heating operation can be carried out on the medium thus obtained. This other heating operation is carried out under the same conditions as those which have been described for the first.

The following step (d) of the method consists in adding, to the precipitate resulting from the preceding step, an additive which is chosen from anionic surfactants, nonionic surfactants, polyethylene glycols and carboxylic acids and their salts, and also surfactants of the carboxymethylated fatty alcohol ethoxylate type.

As regards this additive, reference may be made to the teaching of Application WO 98/45212 and use may be made of the surfactants described in this document.

Mention may be made, as surfactants of the anionic type, of ethoxycarboxylates, ethoxylated fatty acids, sarcosinates, phosphate esters, sulfates, such as alcohol sulfates, ether alcohol sulfates and sulfated alkanolamide ethoxylates, or sulfonates, such as sulfosuccinates, alkylbenzenesulfonates or alkylnaphthalenesulfonates.

Mention may be made, as nonionic surfactant, of acetylenic surfactants, alcohol ethoxylates, alkanolamides, amine oxides, ethoxylated alkanolamides, long chain ethoxylated amines, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and alkylphenol ethoxylates. Mention may in particular be made of the products sold under the trade names Igepal®, Dowanol®, Rhodamox® and Alkamide®.

As regards the carboxylic acids, use may in particular be made of aliphatic mono- or dicarboxylic acids and, among these, more particularly of saturated acids. Use may also be made of fatty acids and more particularly of saturated fatty acids. Mention may thus in particular be made of formic, acetic, propionic, butyric, isobutyric, valeric, caproic, caprylic, capric, lauric, myristic and palmitic acids. Mention may be made, as dicarboxylic acids, of oxalic, malonic, succinic, glutaric, adipic, pimelic, suberic, azelaic and sebacic acids.

Salts of carboxylic acids can also be used, in particular ammonium salts.

Mention may more particularly be made, by way of example, of lauric acid and ammonium laurate.

Finally, it is possible to use a surfactant which is chosen from those of the carboxymethylated fatty alcohol ethoxylate type.

The term "product of the carboxymethylated fatty alcohol ethoxylate type" is understood to mean the products composed of ethoxylated or propoxylated fatty alcohols comprising, at the chain end, a $CH_2$—COOH group.

These products may correspond to the formula:

$$R_1-O-(CR_2R_3-CR_4R_5-O)_n-CH_2-COOH$$

in which $R_1$ denotes a saturated or unsaturated carbon chain, the length of which is generally at most 22 carbon atoms, preferably at least 12 carbon atoms; $R_2$, $R_3$, $R_4$ and $R_5$ may be identical and can represent hydrogen or else $R_2$ can represent a $CH_3$ group and $R_3$, $R_4$ and $R_5$ represent hydrogen; n is a nonzero integer which can range up to 50 and more particularly between 5 and 15, these values being inclusive. It should be noted that a surfactant can be composed of a mixture of products of the above formula for which $R_1$ can be respectively saturated and unsaturated or else products comprising both —$CH_2$—$CH_2$—O— and —$C(CH_3)$—$CH_2$—O— groups.

The surfactant can be added in two ways. It can be added directly to the precipitate suspension resulting from the preceding heating step (c). It can also be added to the solid precipitate after separation of the latter, by any known means, from the medium in which the heating has taken place.

The amount of surfactant used, expressed as percentage by weight of additive with respect to the weight of the composition, calculated as oxide, is generally between 5% and 100%, more particularly between 15% and 60%.

According to one embodiment variant of the method, it is possible to subject the suspended precipitate to milling of moderate energy by subjecting this suspension to shearing, for example using a colloid mill or a stirring turbine.

According to another advantageous variant of the invention, before carrying out the last step of the method (calcination step), the precipitate is washed, after having been separated from the medium in which it was in suspension. This washing operation may take place in water, preferably with water having a basic pH, for example ammonia water.

In a final step of the method according to the invention, the precipitate recovered is subsequently calcined. This calcining makes it possible to develop the crystallinity of the product formed and it can also be adjusted and/or chosen according to the subsequent operating temperature intended for the composition according to the invention, this being done while taking into account the fact that the specific surface area of the product decreases as the calcining temperature employed increases. Such a calcining is generally carried out in air but a calcining carried out, for example, in an inert gas or in a controlled atmosphere (oxidizing or reducing) is very clearly not excluded.

In practice, the calcining temperature is generally limited to a range of values of between 500 and 1000° C.

The method for preparing compositions according to the second variant of the invention will now be described.

This method is identical to that which has been described for preparing the compositions according to the first variant for steps (a), (b), (c) and (d). These steps take place in the same manner and in the same order as for the method described above and therefore the entire description which has been given above applies here.

The method of preparing the compositions according to the second variant is distinguished from the method described above by the calcination step.

The last step of the method, step (e'), comprises a double calcination of the precipitate obtained previously.

The first calcination is carried out in an inert gas or under vacuum. The inert gas may be helium, argon or nitrogen. The vacuum is generally a primary vacuum with a partial pressure of oxygen below $10^{-1}$ mbar. The calcination temperature is generally at least 900° C. A temperature below this value risks not resulting in a product that has the reducibility features given above. The increase of the calcination temperature leads to an increase in the reducibility which may attain values of 100% towards the highest temperatures. The temperature is moreover set at a value that takes into account the fact that the specific surface area of the product decreases as the calcination temperature employed increase. Thus, generally, the maximum calcination temperature is at most 1000° C. as beyond this the specific surface area risks being insufficient. The duration of this first calcination is generally at least 2 hours, preferably at least 4 hours and especially at least 6 hours. An increase in this time usually leads to an increase in the degree of reducibility. Of course, the time may be set as a function of the temperature, a short calcination time requiring a higher temperature.

At the end of the first calcination a second calcination is carried out in an oxidizing atmosphere. The expression "oxidizing atmosphere" is understood to mean air or a gas having an oxidizing property such as ozone, more particularly an air/oxidizing gas mixture. This second calcination is generally carried out at a temperature of at least 600° C. for a time which is generally at least 30 minutes. A temperature below 600° C. may make it difficult to remove the additives used during step (d) described above. It is preferable not to exceed a calcination temperature of 900° C.

The compositions of the invention as described above or as obtained in the method studied above are provided in the form of powders but they can optionally be formed in order to be provided in the form of granules, beads, cylinders or honeycombs of variable dimensions.

The compositions of the invention can be used as catalysts or catalyst supports. Thus, the invention also relates to catalytic systems comprising the compositions of the invention. For such systems, these compositions can thus be applied to any support commonly used in the field of catalysis, that is to say thermally inert supports in particular. This support can be chosen from alumina, titanium oxide, cerium oxide, zirconium oxide, silica, spinels, zeolites, silicates, crystalline silicoaluminum phosphates or crystalline aluminum phosphates.

The compositions can also be used in catalytic systems comprising a coating (wash coat) possessing catalytic properties and based on these compositions, on a substrate of the, for example, metal or ceramic monolith type. The coating can itself also comprise a support of the type of those mentioned above. This coating is obtained by mixing the composition with the support, so as to form a suspension which can subsequently be deposited on the substrate.

These catalytic systems and more particularly the compositions of the invention can have a great many applications. They are therefore particularly well suited to, and thus usable in, the catalysis of various reactions, such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation, the shift conversion or the catalytic oxidation of the soot emitted by internal combustion engines, such as diesel engines or petrol engines operating under lean burn conditions. Finally, the catalytic systems and the compositions of the invention can be used as $NO_x$ traps or for promoting the reduction of $NO_x$, even in an oxidizing environment.

In the case of these uses in catalysis, the compositions of the invention are employed in combination with precious metals. They thus act as support for these metals. The nature of these metals and the techniques for the incorporation of the latter in the support compositions are well known to a person skilled in the art. For example, the metals can be platinum, rhodium, palladium or iridium. They can in particular be incorporated in the compositions by impregnation.

Among the uses mentioned, treatment of the exhaust gases from internal combustion engines (automobile postcombustion catalysis) constitutes a particularly advantageous application. For this reason, the invention also relates to a method for treating the exhaust gases from internal combustion engines which is characterized in that use is made, as catalyst, of a catalytic system as described above or of a composition according to the invention and as described above.

Examples will now be given.

In these examples, measurement of the degree of reducibility is carried out under the following conditions.

Degree of Reducibility

The degree of reducibility of cerium is measured by carrying out a reduction at a programmed temperature on an Ohkure Riken TP5000 device. This device makes it possible to measure the hydrogen consumption of a composition according to the invention as a function of the temperature and to deduce therefrom the degree of reduction of the cerium.

More specifically, hydrogen is used as a reducing gas at 10% by volume in argon with a flow rate of 30 ml/min. The experimental procedure consists in weighing 200 mg of the sample in a previously tared container. The sample is then introduced into a quartz cell containing quartz wool in the bottom. The sample is then covered with quartz wool and positioned in the oven of the measurement device. The temperature program was the following:

oxidation: temperature rise up to 500° C. with a ramp rising at 10° C./min under $O_2$ at 5 vol % in He;
hold of 30 min then drop to 30° C.;
treatment at 30° C. under Ar for 20 min;
reduction, temperature rise up to 900° C. with a ramp rising at 20° C./min under $H_2$ at 10 vol % in Ar;
calibration; and
drop in temperature under Ar from 900° C. to 30° C.

During this program, the temperature of the sample is measured using a thermocouple placed in the quartz cell on top of the sample. The hydrogen consumption during the reduction phase is deduced owing to the calibration of the variation of the thermal conductivity of the gas stream measured at the outlet of the cell using a thermal conductivity detector (TCD).

The degree of reduction of the cerium is calculated from the hydrogen consumption measured between 30° C. and 900° C.

Examples 1 to 11 relate to compositions according to the first variant of the invention.

EXAMPLE 1

This example relates to a composition comprising 63% of zirconium, 15% of cerium, 2% of lanthanum, 15% of yttrium and 5% of praseodymium, these proportions being expressed as percentages by weight of the oxides $ZrO_2$, $CeO_2$, $La_2O_3$, $Y_2O_3$ and $Pr_6O_{11}$.

237 ml of zirconium nitrate (265 g/l as $ZrO_2$), 59.1 ml of cerium nitrate (254 g/l as $CeO_2$, 6.6% of the total cerium in the $Ce^{3+}$ form, the remainder of the cerium in the $Ce^{4+}$ form, and 0.65 mol/l of free acidity), 4.4 ml of lanthanum nitrate (456 g/l as $La_2O_3$), 39.3 ml of yttrium nitrate (382 g/l as $Y_2O_3$) and 10 ml of praseodymium nitrate (500 g/l as $Pr_6O_{11}$) were introduced into a stirred beaker. The solution was subsequently completed with distilled water, so as to obtain 1 liter of a solution of nitrates.

225 ml of an aqueous ammonia solution (12 mol/l) were introduced into a stirred reactor and the solution was subsequently completed with distilled water, so as to obtain a total volume of 1 liter.

The solution of nitrates was introduced into the reactor over one hour with constant stirring.

The suspension thus obtained was placed in a stainless steel autoclave equipped with a stirrer. The temperature of the medium was brought to 150° C. for 2 hours with stirring.

33 g of lauric acid were added to the suspension thus obtained. The suspension was kept stirred for 1 hour.

The suspension was then filtered through a Büchner funnel and then aqueous ammonia solution was added to the filtered precipitate in a proportion of one times the volume of the filtration mother liquors. The product obtained was subsequently brought to 900° C. for 4 hours under stationary conditions.

EXAMPLES 2 TO 10

The preparation was carried out in the same way as in example 1. The proportions of the constituents of the various compositions and the amounts of reactants employed are shown respectively in Tables 1 and 2 below. For example 6, the heating was carried out at 150° C. for 30 minutes. For example 7, the gadolinium nitrate solution had a concentration of $Gd_2O_3$ of 390 g/l. For example 8, the samarium nitrate solution had a concentration of $Sm_2O_3$ of 422 g/l. For example 10, the neodymium nitrate solution had a concentration of $Nd_2O_3$ of 524 g/l. In Table 1, RE denotes the additional rare earth.

TABLE 1

| Example | % Zr | % Ce | % La | % Y | % RE | RE |
|---|---|---|---|---|---|---|
| 1 | 63 | 15 | 2 | 15 | 5 | Pr |
| 2 | 58 | 15 | 2 | 20 | 5 | Pr |
| 3 | 53 | 20 | 2 | 20 | 5 | Pr |
| 4 | 53 | 30 | 2 | 10 | 5 | Pr |
| 5 | 40 | 40 | 2 | 14 | 4 | Pr |
| 6 | 25 | 55 | 3 | 14 | 3 | Pr |
| 7 | 53 | 20 | 2 | 20 | 5 | Gd |
| 8 | 53 | 20 | 2 | 20 | 5 | Sm |
| 9 | 45 | 31 | 4 | 10 | 10 | Gd |
| 10 | 45 | 31 | 6 | 12 | 6 | Nd |

TABLE 2

| Example | VZr | VCe | VLa | VY | VRE | Vaqueous ammonia |
|---|---|---|---|---|---|---|
| 1 | 237 | 59.1 | 4.4 | 39.3 | 10 | 225 |
| 2 | 218 | 59.1 | 4.4 | 52.4 | 10 | 231 |
| 3 | 200 | 78.7 | 4.4 | 52.4 | 10 | 237 |
| 4 | 200 | 118.1 | 4.4 | 26.2 | 10 | 235 |
| 5 | 151 | 157.5 | 4.4 | 36.6 | 8 | 251 |

TABLE 2-continued

| Example | VZr | VCe | VLa | VY | VRE | Vaqueous ammonia |
|---|---|---|---|---|---|---|
| 6 | 94 | 216.5 | 6.6 | 36.6 | 6 | 251 |
| 7 | 200 | 78.7 | 4.4 | 52.4 | 12.8 | 203 |
| 8 | 200 | 78.7 | 4.4 | 52.4 | 11.8 | 236 |
| 9 | 169 | 122 | 8.8 | 26 | 25.6 | 236 |
| 10 | 169 | 122 | 13.2 | 31.4 | 11.5 | 140 |

VZr denotes the volume of the zirconium nitrate solution used.

VCe denotes the volume of the cerium nitrate solution used.

VLa denotes the volume of the lanthanum nitrate solution used.

VY denotes the volume of the yttrium nitrate solution used.

VRE denotes the volume of the additional rare earth nitrate solution used.

Vaqueous ammonia denotes the volume of the aqueous ammonia solution used.

All the values are given in ml.

In order to determine their thermal stability, the compositions as obtained at the end of the method described in example 1 were then subjected to calcinations in air at various temperatures. The specific surface areas measured after these heat treatments are given in Table 3 below. The values are expressed in $m^2/g$.

TABLE 3

| Example | 4 h/900° C. | 4 h/1000° C. | 10 h/1100° C. | 10 h/1150° C. |
|---|---|---|---|---|
| 1 | 72 | 62 | 32 | 18 |
| 2 | 70 | 53 | 30 | 23 |
| 3 | 66 | 47 | 27 | 22 |
| 4 | 71 | 55 | 26 | 16 |
| 5 | 74 | 55 | 32 | 17 |
| 6 | 61 | 43 | 24 | 16 |
| 7 | 72 | 34 | 19 | 15 |
| 8 | 72 | 34 | 17 | 15 |
| 9 | 72 | 55 | 30 | 20 |
| 10 | 72 | 56 | 31 | 20 |

After a heat treatment for 10 hours at 1150° C. in air, the X-ray analysis of these samples was carried out. The analyses were carried out on powder using a Panalytical diffractometer equipped with a multichannel detector of X'Celerator type and with a Kβ/Kα monochromator. The data were collected over 20 minutes between 2θ=10° and 2θ=95° with a step of 0.017 mm.

The appended figures are X-ray diagrams obtained by these analyses. These diagrams systematically reveal a single phase of cubic symmetry (the peaks at 2θ=44.6° and 2θ=51.5° are due to the sample holder).

FIG. 1 corresponds to the X-ray diagram of the product according to example 1. The lattice parameter measured was 5.205 Å.

FIG. 2 corresponds to the X-ray diagram of the product according to example 5. The lattice parameter measured was 5.269 Å.

FIG. 3 corresponds to the X-ray diagram of the product according to example 6. The lattice parameter measured was 5.322 Å.

EXAMPLE 11

This example relates to a composition comprising 53% of zirconium, 20% of cerium, 4% of lanthanum, 18% of yttrium and 5% of neodymium, these proportions being expressed as weight percentages of the oxides $ZrO_2$, $CeO_2$, $La_2O_3$, $Y_2O_3$ and $Nd_2O_3$.

200 ml of zirconium nitrate (265 g/l as $ZrO_2$), 80 ml of cerium IV nitrate (254 g/l as $CeO_2$), 9 ml of lanthanum nitrate (456 g/l as $La_2O_3$), 48 ml of yttrium nitrate (382 g/l as $Y_2O_3$) and 10 ml of neodymium nitrate (500 g/l as $Nd_2O_3$) were introduced into a stirred beaker. The solution was subsequently completed with distilled water so as to obtain 1 liter of a solution of nitrates.

225 ml of an aqueous ammonia solution (12 mol/l) were introduced into a stirred reactor and the solution was subsequently completed with distilled water, so as to obtain a total volume of 1 liter.

The solution of nitrates was introduced into the reactor over one hour with constant stirring.

The suspension thus obtained was placed in a stainless steel autoclave equipped with a stirrer. The temperature of the medium was brought to 150° C. for 2 hours with stirring.

33 g of lauric acid were added to the suspension thus obtained. The suspension was kept stirred for 1 hour.

The suspension was then filtered through a Büchner funnel and then aqueous ammonia solution was added to the filtered precipitate in a proportion of one times the volume of the filtration mother liquors.

The precipitate obtained after filtering and washing was then calcined in air for 4 hours at 900° C.

The examples which follow relate to compositions according to the second variant of the invention.

EXAMPLE 12

The same composition as in example 11 was prepared by proceeding in the same manner up to the calcination step.

Next, at first, a first calcination was carried out under nitrogen for 4 h at 1000° C. After returning to ambient conditions, a second calcination was carried out in air for 4 h at 700° C.

EXAMPLE 13

The same composition as in example 10 was prepared according to the same procedure up to the calcination step. Next, at first, a first calcination was carried out under nitrogen for 4 h at 1000° C. After returning to ambient conditions, a second calcination was carried out in air for 4 h at 700° C.

Given in Tables 4 and 5 below are the reducibility values of the compositions from examples 10, 11, 12 and 13 and the surface area values for compositions 11 to 13.

The surface area values and reducibility values given were measured on products obtained according to the method described in the examples and which have undergone a further calcination at the temperatures and for the durations indicated in the tables.

TABLE 4

| Reducibility | Calcination 4 h at 900° C. |
|---|---|
| Example 10 | 65% |
| Example 11 | 65% |
| Example 12 | 96% |
| Example 13 | 85% |

It is specified that after calcining for 10 h at 1150° C., the compositions of examples 11 to 13 were in the form of a pure cubic crystalline phase.

TABLE 5

| Surface area | Calcination | | | |
|---|---|---|---|---|
| | 4 h at 900° C. | 4 h at 1000° C. | 10 h at 1150° C. | 10 h at 1200° C. |
| Example 11 | 65 m²/g | 52 m²/g | 22 m²/g | 9 m²/g |
| Example 12 | 51 m²/g | 37.5 m²/g | 21 m²/g | 10.5 m²/g |
| Example 13 | 49.7 m²/g | 35 m²/g | 21 m²/g | 12 m²/g |

It can be seen that the compositions according to the second variant of the invention have a reducibility at 900° C. that is markedly improved while retaining a high specific surface area at this same temperature and also at higher temperatures.

The invention claimed is:

1. A catalyst composition based on oxides of zirconium, of cerium and of yttrium, further comprising lanthanum oxide and an oxide of an additional rare earth other than cerium, lanthanum and yttrium, in a weight proportion of zirconium oxide of at least 25%, from 15% to 60% of cerium oxide, from 10% to 25% of yttrium oxide, from 2% to 10% of lanthanum oxide and from 2% to 15% of the oxide of the additional rare earth, said composition having, after calcination for 10 hours at 1,150° C., a specific surface area of at least 15 m²/g and also a cubic phase.

2. The catalyst composition as defined by claim 1, said additional rare earth being selected from the group consisting of neodymium, praseodymium, gadolinium and samarium.

3. The catalyst composition as defined by claim 1, wherein the total weight proportion of the oxides of yttrium, of lanthanum and of the additional rare earth is at most 30%.

4. The catalyst composition as defined by claim 1, wherein the weight proportion of zirconium oxide is at least 40% and that of cerium oxide at most 40%.

5. The catalyst composition as defined by claim 1, wherein the weight proportion of zirconium oxide is at least 50% and that of cerium oxide at most 25%.

6. The catalyst composition as defined by claim 1, wherein the weight proportion of zirconium oxide is at least 50%, that of cerium oxide ranges from 15% to 30%, that of yttrium oxide ranges from 10% to 20% and that of lanthanum oxide ranges from 2% to 5%.

7. The catalyst composition as defined by claim 6, wherein the weight proportion of yttrium oxide ranges from 15% to 20%.

8. The catalyst composition as defined by claim 1, having, after calcination for 4 hours at 1,000° C., a specific surface area of at least 30 m²/g.

9. The catalyst composition as defined by claim 1, the additional rare earth comprising praseodymium or neodymium and having after calcination for 10 hours at 1,150° C., a specific surface area of at least 20 m²/g.

10. The catalyst composition as defined by claim 1, having after calcination for 4 hours at 900° C., a specific surface area of at least 65 m²/g.

11. The catalyst composition as defined by claim 9, the additional rare earth comprising neodymium or praseodymium and having after calcination for 4 hours at 1,000° C., a specific surface area of at least 45 m²/g.

12. The catalyst composition as defined by claim 1, having after calcination for 10 hours at 1,150° C., a specific surface area of at least 20 m²/g.

13. The catalyst composition as defined by claim 1, having, after calcination for 10 hours at 1,100° C., a specific surface area of at least 30 m²/g.

14. The catalyst composition as defined by claim 1, having a degree of reducibility, after calcination for 4 hours at 900° C., of at least 80%.

15. The catalyst composition as defined by claim 1, having a degree of reducibility, after calcination for 4 hours at 900° C., of at least 85%.

16. The catalyst composition as defined by claim 1, having a degree of reducibility, after calcination for 4 hours at 900° C., of at least 90%.

17. A method for preparing a composition as defined by claim 1, which comprises the following steps:
(a) providing a mixture comprising compounds of zirconium, of cerium, of yttrium, of lanthanum and of the additional rare earth;
(b) contacting said mixture with a basic compound, whereby a precipitate is obtained;
(c) heating said precipitate in an aqueous medium;
(d) adding to the precipitate obtained in the preceding step an additive selected from the group consisting of anionic surfactants, nonionic surfactants, polyethylene glycols, carboxylic acids and salts thereof and carboxymethylated fatty alcohol ethoxylate surfactants; and
(e) calcining the precipitate thus formed.

18. A method for preparing a composition as defined by claim 1, which comprises the following steps:
(a') providing a mixture comprising compounds of zirconium, of cerium, of yttrium, of lanthanum and of the additional rare earth;
(b') contacting said mixture with a basic compound, whereby a precipitate is obtained;
(c') heating said precipitate in an aqueous medium;
(d') adding to the precipitate obtained in step (c') an additive selected from the group consisting of anionic surfactants, nonionic surfactants, polyethylene glycols, carboxylic acids and salts thereof and carboxymethylated fatty alcohol ethoxylate surfactants; and
(e') calcining the precipitate thus obtained under an inert gas or under vacuum, and than conducting a second calcining under an oxidizing atmosphere.

19. The method as defined by claim 17, said compounds of zirconium, of cerium, of yttrium, of lanthanum and of the additional rare earth comprising the nitrates, sulfates, acetates, chlorides or ceric ammonium nitrates thereof.

20. The method as defined by claim 17, wherein the heating of the precipitate of step (c) is carried out at a temperature of at least 100° C.

21. The method as defined by claim 17, wherein the precipitate is washed at the end of step (d) and before calcining.

22. A catalytic system comprising the catalytic composition as defined by claim 1.

23. A method for treating the exhaust gases from an internal combustion engine, comprising conveying same through the catalytic system as defined by claim 22.

24. A catalytic converter for the exhaust gases from an internal combustion engine containing the catalytic composition as defined by claim 1.

* * * * *